US012358051B2

(12) United States Patent
Pouille et al.

(10) Patent No.: US 12,358,051 B2
(45) Date of Patent: Jul. 15, 2025

(54) METHOD FOR INTEGRATING A SENSOR IN A PART MADE BY ADDITIVE MANUFACTURING

(71) Applicant: COMMISSARIAT A L'ENERGIE ATOMIQUE ET AUX ENERGIES ALTERNATIVES, Paris (FR)

(72) Inventors: Quentin Pouille, Antony (FR); Ayoub Ladaci, Paris (FR); Fernando Lomello, Gif-sur-Yvette (FR); Guy Cheymol, Bures sur Yvettes (FR); Hicham Maskrot El Idrissi, Antony (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 242 days.

(21) Appl. No.: 18/067,113

(22) Filed: Dec. 16, 2022

(65) Prior Publication Data

US 2023/0191485 A1 Jun. 22, 2023

(30) Foreign Application Priority Data

Dec. 17, 2021 (FR) ..................... 21 13909

(51) Int. Cl.
*B33Y 80/00* (2015.01)
*B22F 7/08* (2006.01)
(Continued)

(52) U.S. Cl.
CPC ............... *B22F 7/08* (2013.01); *B22F 10/28* (2021.01); *B33Y 10/00* (2014.12); *B33Y 80/00* (2014.12);
(Continued)

(58) Field of Classification Search
CPC ...... B22F 7/08; B22F 10/28; B22F 2301/205; B22F 5/10; B22F 10/85; B22F 10/10; B22F 10/38; B22F 7/00; B33Y 10/00; B33Y 80/00; B33Y 40/00; B33Y 50/02; G01D 5/35309; Y02P 10/25; G01L 9/0079
(Continued)

(56) References Cited

U.S. PATENT DOCUMENTS

2005/0231729 A1 10/2005 Lopushansky et al.
2009/0225325 A1 9/2009 Lopushansky et al.

FOREIGN PATENT DOCUMENTS

WO WO-2020051843 A1 * 3/2020 ............. B22F 10/14

OTHER PUBLICATIONS

French Preliminary Search Report issued Oct. 20, 2022, in French Application 21 13909, filed on Dec. 17, 2021 (with English Translation of Categories of cited documents and Written Opinion), 11 pages.
(Continued)

*Primary Examiner* — Robert R Raevis
(74) *Attorney, Agent, or Firm* — Oblon, McClelland, Maier & Neustadt, L.L.P.

(57) ABSTRACT

A method for integrating a sensor into a metal part including creating, by additive printing, of a first portion of the part, including a volume for housing a sensor. The volume has a width greater than that of the sensor. The method also includes depositing the sensor in said housing volume and creating, by additive printing, a second portion of the part covering the sensor and forming a molten puddle in the housing volume, on either side of the sensor.

15 Claims, 7 Drawing Sheets

(51) Int. Cl.
*B22F 10/28* (2021.01)
*B33Y 10/00* (2015.01)
*G01D 5/353* (2006.01)

(52) U.S. Cl.
CPC .... *G01D 5/35309* (2013.01); *B22F 2301/205* (2013.01)

(58) Field of Classification Search
USPC ............. 73/19.01–31.06, 61.41–61.79, 73/862–862.382, 763–780, 493, 431; 374/208; 324/438; 29/593
See application file for complete search history.

(56) References Cited

OTHER PUBLICATIONS

Stoll, P. et al. "Embedding Fibre Optical Sensors into SLM Parts" Solid Freeform Fabrication 2016: Proceedings of the 27$^{th}$ Annual International Solid Freeform Fabrication Symposium—An Additive Manufacturing Conference Reviewed Paper (11 pages).

Mathew, J. et al. "Integrating Fiber Fabry-Perot Cavity Sensor Into 3-D Printed Metal Components for Extreme High-Temperature Monitoring Applications" IEEE Sensors Journal, vol. 17, No. 13, Jul. 1, 2017 (8 pages).

Mathew, J. et al. "SS316 structure fabricated by selective laser melting and integrated with strain isolated optical fiber high temperature sensor" Proceeding of SPIE, vol. 9634, IEEE Sep. 28, 2015 (4 pages).

\* cited by examiner

METHOD FOR INTEGRATING A SENSOR IN A PART MADE BY ADDITIVE MANUFACTURING

TECHNICAL FIELD AND PRIOR ART

The invention relates to the field of advanced instrumentation of mechanical parts, in particular coming from additive manufacturing, with the goal of carrying out integrated RT-SHM (Real Time Structural Health Monitoring).

It is sought to instrument such parts by integration of sensors, preferably optical fibre, during a printing procedure. These sensors allow to measure at least one parameter such as the temperature, or the deformation, or the stresses, or the vibrations or a dose of radiation.

First, this integration allows the online monitoring of the stresses and/or of the temperatures applied onto the mechanical parts during their manufacturing, for the control and the optimisation of the printing process. And, secondly, it allows, during the use of these parts as main parts or auxiliary parts, to have a monitoring of the wear and of the potential degradations of the system into which they are integrated. This allows to anticipate any failure, to improve the management and the replacement of these parts or of other components of the system and to create a predictive maintenance thereof.

On this subject, the articles by A. Barrias et al., "A Review of Distributed Optical Fiber Sensors for Civil Engineering Applications", Sensors, vol. 16, no 5, 2016, doi: 10.3390/s1605074818, or by D. D. Francesca et al., "Qualification and Calibration of Single-Mode Phosphosilicate Optical Fiber for Dosimetry at CERN", *J. Lightwave Technol.*, vol. 37, no 18, p. 4643-4649, sept. 2019, are known.

At present, the sensors used are located outside the parts and are subjected to outside stresses (environment, impacts . . . ). But these sensors can only measure the outside of a part and not the inside, and it is therefore very difficult to know the behaviour inside a structure without using approximation and extrapolation models.

The integration of a sensor, in particular optical fibre, inside a component is possible by metal additive manufacturing, which allows to eliminate the need for the conventional measurement techniques, since the sensor measures its own physical values which are the same as the target part.

Such an integration of a sensor also allows to protect it from the operating environment of the part in which it is located and to reduce the volume engendered by conventional surface sensors.

However, the integration of sensors by additive manufacturing is very complex. One known integration technique is described in the document by Stoll, P. et al. entitled: "Embedding fibre optical sensors into SLM parts", in: 27th Annual International Solid Freeform Fabrication Symposium, pp. 1815-1825 (2016). But the stresses of the printing strongly degrade the sensor and often lead to its destruction.

Other known solutions involve protecting fibre sensors (like Bragg networks) by dense layers of materials like chromium/nickel; on this subject, see, in particular, the article by Dirk Haverman et al., entitled: "Embedding optical fibers into stainless steel using laser additive manufacturing", ICALEO 2013, 381 (2013); doi: 10.2351/1.5062904.

These known solutions are complex, their implementation has a high cost, and they involve a high insulation of the sensor (fibre) with respect to the measurement environment; they thus introduce considerable measurement errors.

One problem that arises is thus finding a sensor capable of resisting an additive manufacturing method (high temperature, mechanical stress, high laser density . . . ) and/or minimising its degradation in order to obtain good measurement performance during and after the integration.

Another problem is the optimisation of the parameters of a method for integrating such a sensor; in particular, if an additive printing technique is implemented, the parameters such as the scanning speed and strategy, and/or the power of the laser, and/or the parameters relating to the integration geometry—that is to say the shape of the part in which the fibre will be positioned before the integration (half-circle, rectangle . . . )— must be found.

Yet another problem lies in the choice, the adaptation and the optimisation of a sensor and of the corresponding measurement technique (choice of the materials, choice of the sensor, physical principle of the measurement . . . ).

Yet another problem is finding a production method that is fast: the known techniques are long, for example at least 24 h are needed to carry out the deposition of nickel around the fibre implemented in the technique described in the article by P. Stoll et al. mentioned above.

DISCLOSURE OF THE INVENTION

The invention aims to overcome all or a part of these problems.

It relates first of all to a method for integrating a sensor into a metal part, including:

a)—the creation by additive printing of a first part of the metal part, including a volume for housing a sensor, this volume having a width greater than that of the sensor;

b)—the deposition of the sensor in said housing volume;

c)—the creation by additive printing of a second part of the metal part, covering the sensor and the formation of a molten puddle in the housing volume, on either side of the metal tube of the sensor.

Preferably, the additive printing of said second part of the metal part, covering the sensor, results in the formation of a molten puddle in the housing volume, on either side of the sensor.

The metal of the molten puddle allows, by cooling, to fasten the sensor to the walls of the housing volume.

While cooling, the metal of the molten puddle attaches on the one hand onto the sensor and on the other hand onto the edges of the housing volume, more precisely the edges of the layers that face the sensor. The bond thus formed extends continuously along the sensor according to the direction of extension of the latter and preferably also in terms of height.

The sensor can be or include for example an optical sensor, including for example a Fabry-Pérot cavity, or a Bragg network, or an optical fibre, for example for the measurement of the temperature and/or of the stresses and/or of a dose of radiation, for example by reflectometry, and/or a temperature sensor and/or a chemical sensor containing an optical fibre for the measurement of the gases, and/or of the pH, and/or of the corrosion.

The sensor can also be or include an optical fibre sensor based on Rayleigh or Raman scattering. For example it includes an optical fibre and optionally a mirror in a tube.

An optical fibre can be coated with a coating, for example made of Al or Au or Cu, having a thickness smaller than 20 µm.

The additive printing can be carried out by scanning the surface of a powder bed, including the housing volume. The additive printing can be carried out by laser fusion on a powder bed, or laser fusion of a wire or projection of powder onto a laser (technique called "DED") or by electron beam additive printing, or by DED (Directed Energy Deposition).

For example, a laser scans the surface of the successive layers of a powder bed.

The housing volume can have a convex shape, it has for example the shape of a channel in which the sensor can be deposited.

The additive printing can implement, during step c):
the deposition of layers of metal powder scanned by a laser, in a manner perpendicular to a direction of extension of the sensor;
at least one scanning, by a laser beam, of the surface of the first layer which covers the sensor and according to a direction parallel to the direction of extension of the latter.

A method according to the invention can further include the creation of a hollow under the location in which the sensor must be positioned and the addition of a solder sheet in this hollow. This solder sheet allows to bind the sensor to the bottom of the cavity.

The sensor can include an element sensitive to a deformation, or to a variation in temperature or to a stress or to vibrations or to a dose of radiation, this sensitive element being disposed inside a metal tube. A method according to the invention can include one or more previous steps of forming or of creating the sensor, for example in a tube. For example, before step b), the sensor can be formed by the introduction or the formation in the tube of an element or of a sensor, sensitive to a deformation, or to a variation in temperature or to a stress or to vibrations or to a dose of radiation. More specifically, the formation of a sensor in the tube can include:
the insertion of a metal rod into the tube;
the insertion of an optical fibre, one end of which faces an end of the rod, at a distance ($L_c$) from the latter, these two ends defining a Fabry-Pérot cavity.

The metal rod can be fastened in the tube, for example by soldering. The optical fibre can be fastened in the tube, for example by gluing.

In a method or a device according to the invention, the metal part can be for example made of steel or made of a titanium alloy, for example Ti64, or made of Cu, or made of Nb, or made of Cr, or made of W.

The invention also relates to an integrated device comprising a sensor in a metal part, including:
a channel containing said sensor;
a homogenous mass of the material of the part surrounding said sensor and to which the latter is fastened.

The integrated device sensor according to the invention is directly surrounded by the material, at least one parameter (for example: deformation and/or temperature . . . ) of which must be measured. In other words, there is no thick intermediate sheathing between the sensor itself and the environment to be measured.

According to one embodiment, the sensor includes a Fabry-Pérot cavity and/or a temperature sensor or a Bragg network, or a sensor, for example an optical fibre, for the measurement of the temperature and/or of the stresses and/or of a dose of radiation, for example by reflectometry, and/or a chemical sensor containing an optical fibre for the measurement of the gases, and/or of the pH, and/or of the corrosion. The sensor can also be an optical fibre sensor based on Rayleigh or Raman scattering.

For a sensor including a Fabry-Pérot cavity, the latter can be formed between an end of a metal rod and an end of an optical fibre.

DETAILED DISCLOSURE OF SPECIFIC EMBODIMENTS

Steps of an embodiment of a method according to the invention are illustrated in FIGS. 1A-1E, with a view to integrating or incorporating a metal tube containing a sensor into a part or a metal part (here: steel; but Ti64 (alloy of titanium, of aluminium and of vanadium), or Cu, or Nb, or Cr, or W or any metal that can be used for additive manufacturing can also be implemented).

A method according to the invention can implement the technique of additive printing by fusion on a powder bed. According to this technique, the material selected to create a part or a metal part is deposited layer by layer, for example by one or more nozzles controlled by computer. The material of each layer can be melted by a laser beam; other techniques can be used to carry out the step of fusion in the context of the present invention, for example the technique of electron beam additive manufacturing (EBM, or Electron Beam Melting), or by DED (Directed Energy Deposition). Each layer can have for example a thickness between several micrometres and several tens of micrometres, for example between 10 μm and 500 μm, this thickness depending on the method, the powder and the machined implemented. The part or the metal part can have been previously designed by a computer-aided design (CAD) technique. Complementary elements relating to this technique of additive printing by fusion on a powder bed can be found for example in the document by N. Shahrubudina et al.: "An Overview on 3D Printing Technology: Technological, Materials, Applications", 2nd International Conference on Sustainable Materials Processing and Manufacturing (SMPM 2019), Procedia Manufacturing 35 (2019) 1286-1296, and in the documents cited in this article. To calculate the thermal penetration δ of the heat provided by the laser beam on a layer the following formula (taken from the work by R. Poprawe, Tailored light 2: Laser Application Technology. Heidelberg, Springer, 2011), in which $\alpha_{316}L$ is the thermal diffusion coefficient of the chosen steel and t the time, can be used:

[Math 1]

$$\delta = \sqrt{4 * \alpha_{316L} * t} \quad \text{(EQ 1)}$$

This formula can be generalized to other metals, by replacing the coefficient $\alpha_{316L}$ by the thermal diffusion coefficient of the material in question.

Figure 2:
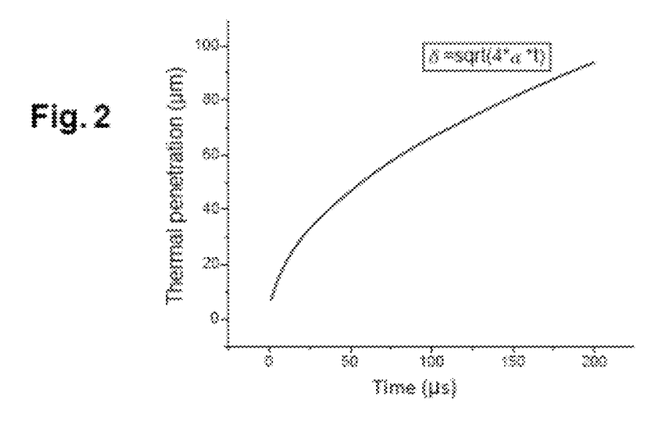
FIG. 2 shows the change in the thermal penetration in a metal powder according to the time of exposure of the latter to a laser.

For the example of intended use, a thermal penetration of 60 µm is desired, a value which corresponds to 2 times the thickness of the layer of powder that will be deposited, in order to guarantee a good density of the material. Moreover, in general, a thermal penetration which corresponds to 2 times the thickness of the layer of powder deposited allows to not damage the sensor when the latter is covered by the material of the part (see the creation of the $2^{nd}$ part, or upper part, of the part, as explained below). The change in the thermal penetration $\delta$ according to the time t of exposure to the laser (according to the formula EQ1 above) is shown in FIG. 2. The time of exposure allows to define the speed of passage of the laser. In the example chosen, for a thermal penetration of 60 µm, the time of exposure is 82 µs. This time of exposure allows to define the speed of the laser.

According to the technique implemented in the context of the present invention, the sensor including here a sensitive element in a metal tube:

a $1^{st}$ part 2, called lower part, of the part is created (FIG. 1A), including a housing volume 4 (a channel in the example illustrated) including an upper opening 5 allowing to house a metal tube 20 (FIG. 1B, in which the sensor positioned in the cavity 4 is visible), while leaving a space between each side of the tube and the material deposited by additive printing, in order to form a molten puddle as explained below. The volume 4 thus defines a concavity in the part 2 of the part and itself has a convex shape; it can have, in a cross-section perpendicular to its longitudinal direction of extension, the shape of a portion of a cylinder or of an ellipse;

the sensor is inserted (FIG. 1B) into this housing volume 4; a distance or a clearance d is maintained between the outer surface of the tube and the edges 8, 10 of the housing volume 4, actually the edges of the layers of powder; this clearance is preferably chosen to correspond to the width of the molten puddle (see below); it can be for example 50 µm on each side of the metal tube; preferably, this clearance takes into account geometric tolerances of the machine used, which is in this example a Trumpf TruPrint 1000 machine. Then the tube is fastened by laser soldering in several points 11, 13 along this tube (see FIG. 1C and FIG. 1D, the latter being a top view); as visible in FIG. 1B and in FIG. 1C, the tube protrudes above the level defined by the upper surface 3 of the $1^{st}$ part 2;

a $2^{nd}$ part 6, called upper part, of the part is then created (FIG. 1E) by additive printing. On the layers deposited, the laser is scanned in a manner perpendicular to the metal tube 20: the stoppage of the laser at a certain distance defined by the lateral clearance between the tube and the edges 8, 10 of the housing volume 4 allows the molten material to flow into the latter, which leads to the formation of a molten puddle on either side of the metal tube 20; while cooling, the metal of the molten puddle attaches on the one hand onto the metal tube and on the other hand onto the edges 8, 10 of the housing volume, more precisely the edges of the layers that face the tube 20. The bond thus formed extends continuously along the tube according to the direction of extension of the latter as well as in terms of height. The molten puddle is generated after positioning of the fibre in the volume 4 and results from the interaction between the laser and the metal powder when the upper part is created.

Figure 3A:
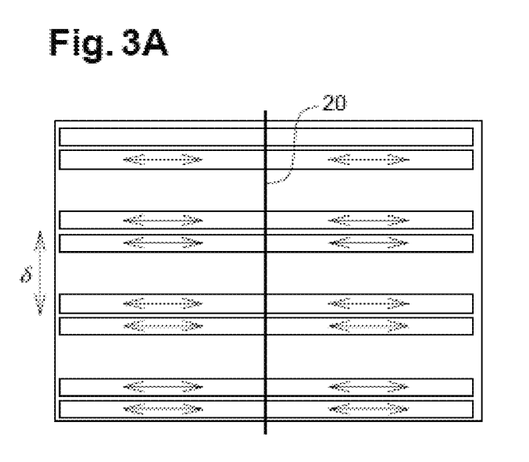
FIG. 3A shows the laser scanning strategy in the context of a method according to the invention.
Figure 3B:
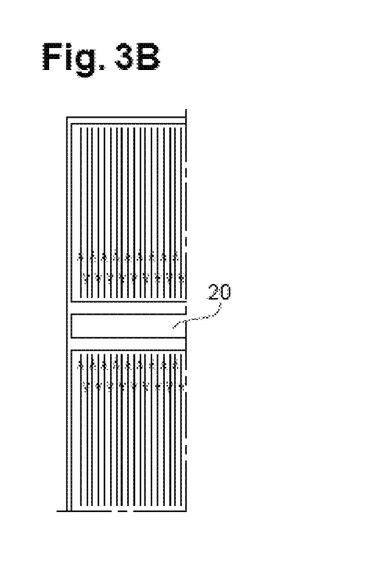
FIG. 3B is an enlarged view of a part of FIG. 3A.
Figure 3C:
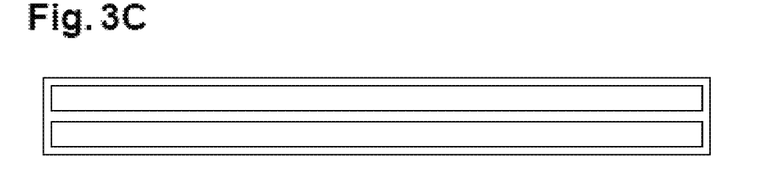
FIG. 3C shows a step of passage of the laser parallel to the tube containing the sensor, in a top view.

The movements of the laser beam on the various layers of the top or upper part are schematically shown in FIG. 3A and FIG. 3B, which are top views of the part that contains the tube 20, FIG. 3B being a detailed view of a part of FIG. 3A:

first, the laser beam scans the material according to a trajectory perpendicular, and preferably only perpendicular, to the direction of extension of the tube 20 (FIGS. 3A and 3B); these scans allow, when the laser arrives near the edges 8, 10, to form the liquid bath, as explained above. A scanning that is not perpendicular to the fibre leads to too much heating of the latter and it becomes malleable: the sensor is no longer usable;

the laser beam is guided in a manner parallel to the tube 20 on the first layer of the printing that covers the tube (FIG. 3C); this parallel passage (actually: a single parallel passage) allows to consolidate the bond between the tube and the part.

FIG. 3A also illustrates the possibility of several sensors simultaneously. Here 4 sensors are shown, but there can be any number N thereof (N=1 or N>1).

It is possible to optimise the technique described above to ensure a better bond between the tube 20 and the part; in particular, a hollow can thus be made under the sensor, into which a solder sheet 15 can be inserted (see FIG. 1C); the assembly, including this sheet, can be placed in a furnace, for example at approximately 700° C., to melt the sheet and create a bond between the part and the tube.

For example, the parameters selected for an implementation of the invention on 316L steel are the following (parameters that can be modified according to the materials and/or the machines used; in this example, the laser is a fibre ytterbium laser having a wavelength of 1064 nm):

Power=80 W;

Speed of movement of the laser on the surface of the layers=642 mm·s$^{-1}$;

Spacing between neighbouring zones of scanning of the laser beam $\delta$=70 µm;

Height of each layer of powder=30 µm;

Size of the laser spot=30 µm.

The creation of a sensor that can be used in the context of the invention will now be described: in this example this is a miniaturised Fabry-Pérot sensor, which allows to measure the mechanical stresses applied to the part in which the sensor is disposed. This type of sensor is reliable, precise and robust; other sensors can be used, examples of these other sensors are given above and in the present application; among them: a Bragg network, or an optical fibre for the measurement of temperature, and/or of the stresses and/or of a dose of radiation (measurement by reflectometry), and/or a temperature sensor and/or a chemical sensor containing an optical fibre for the measurement of the gases, and/or of the pH, and/or of the corrosion . . . .

Figure 1A:
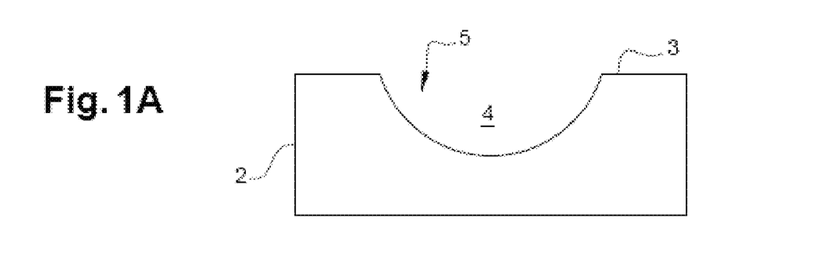
FIG. 1A-FIG. 1E show an embodiment of a method according to the invention.
Figure 1B:
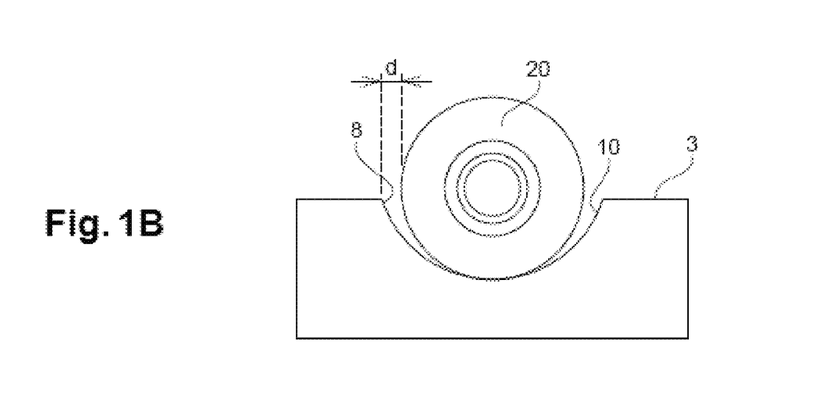
Figure 1C:
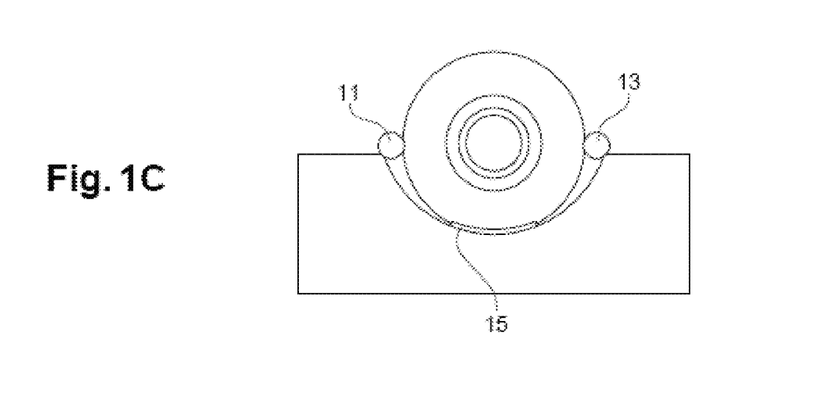
Figure 1D:
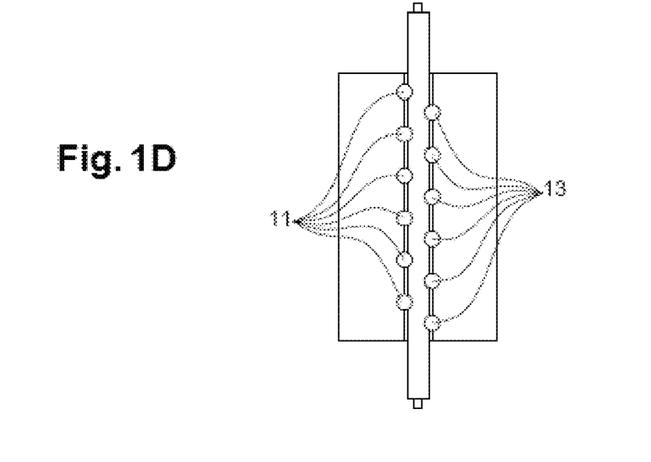
Figure 1E:
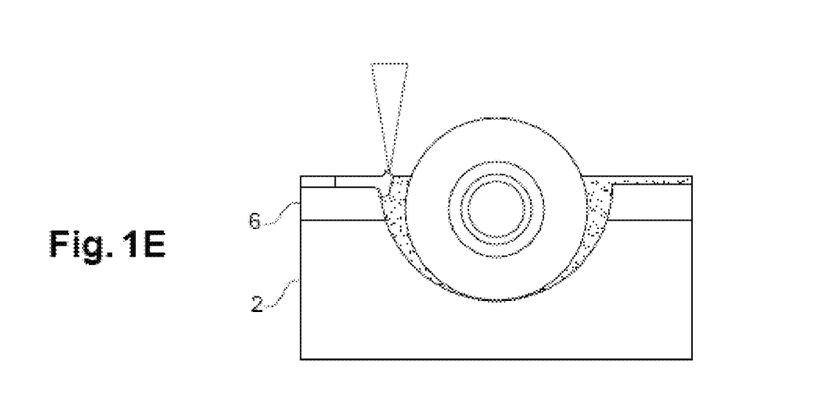

To do this, a metal tube 20 is chosen (FIG. 4), for example made of 316L steel, the inner diameter D of which allows to house on the one hand a metal rod 28 and on the other hand an optical fibre 26. It is this tube 20 that is then positioned as illustrated in FIG. 1B. This tube 20 is for example made of stainless steel, for example again 316L (for example: supplier UNIMED); it can have the dimensions 200 µm (inner diameter)/400 µm (outer diameter), but other dimensions can be used, for example between 80 µm and 1 mm for the inner diameter and between 200 µm and 10 mm for the outer diameter. It has a length of several tens of mm, for example 50 mm; it can be bored, then polished on its outer faces, to facilitate its handling.

Figure 4:
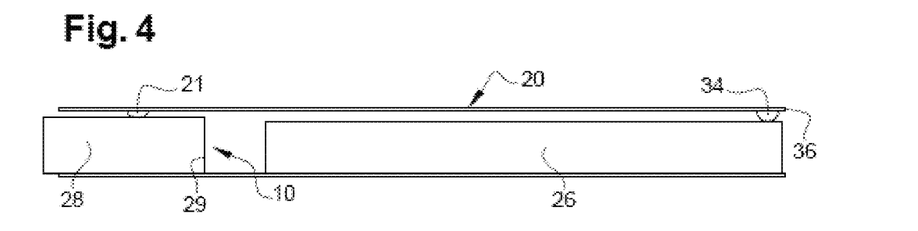
FIG. 4 shows an embodiment of an example of a sensor for an implementation in the context of the invention.

The rod 28 used is metallic, for example made of steel, for example again a 316L steel (supplier GoodFellow), having a length Lt (for example Lt=1 mm); an end 29 of this rod can be polished, for example with 30 µm, 16 µm, 9 µm, 3 µm, 1 µm then 0.3 µm papers in order to have a flat face 10 that will allow the reflection of light.

This rod 28 can be positioned and fastened in the tube 20, for example by soldering (the reference 21 designates a soldering point). The soldering 21 is carried out inside the tube via a laser welder (for example: pulse laser with a wavelength of approximately 1 µm, U=234V, t (duration of the pulse)=1.0 ms, f (frequency of repetition of the pulse)=1 Hz: the laser beam is directed onto the tube, which locally melts the latter and allows to bind it to the inner rod). Once this step has been carried out, an optical fibre, for example having a diameter of 125 µm, with a coating, for example made of aluminium (supplier IXblue/Fiber Guide) or made of gold or made of copper can be positioned in the tube facing the metal rod (FIG. 4), at a distance $L_c$ from the latter; this coating, having a thickness smaller than 20 µm, allows resistance to the temperature. The difference between this thin coating, with which the entire optical fibre is provided, and the very thick layer of nickel with which the fibre in the document by P. Stoll et al. already cited above must be provided should be noted: the deposition of this very thick layer required additional operations, which are very meticulous and which are time-consuming (the creation of a layer of 200 µm of nickel, as described in this document, requires approximately 2 days; the creation of a sensor according to the invention requires approximately 3 h). The fibre can then be fastened, for example with ceramic glue 34, to an end 36 of the tube 20. Interferometric fringes can thus be formed, which allow to measure the distance $L_c$ and to get the deformation of the part to which the tube 20 is fastened.

The miniature sensor thus created has the property of not degrading the mechanical properties of a metal part made of steel, on the one hand via its chemical composition (316L), but also via its small size, since the outer diameter of the tube 20 is in general <1 mm.

To illustrate the feasibility of the technique according to the invention, a part integrating a tube 20 containing a sensor of the Fabry-Pérot type was created, on the one hand by a method according to the invention (FIG. 5A) and on the other hand by a method based on known techniques. It is visible in FIG. 5A, which is a cross-section of the part perpendicular to the direction of extension of the optical fibre 26, that the sensor is well integrated into the part; in this drawing neither the tube 20 (it has been shown with dotted lines around the fibre 26) nor the layers deposited by 3D printing are visible because the integration of the assembly is almost perfect; however, the integration with the known method is a failure, as visible in FIG. 5B, which reveals a destruction of the metal tube and of the fibre that it contains (in each of these 2 drawings, the black traces in the lower part correspond to a space under the fibre (the additive manufacturing is carried out from the top).

Figure 5A:
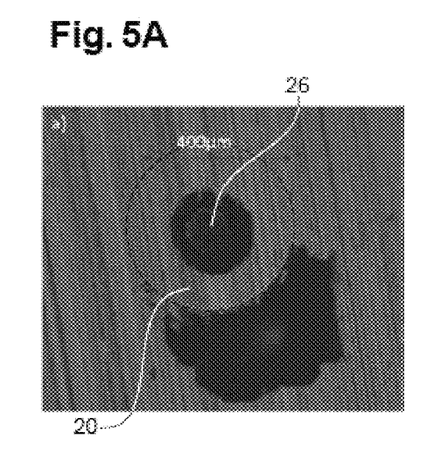
FIG. 5A-FIG. 5B respectively show a cross-sectional view of an integration of a sensor, implementing a method according to the invention (FIG. 5A), and of an integration trial with a known method (FIG. 5B)
Figure 5B:
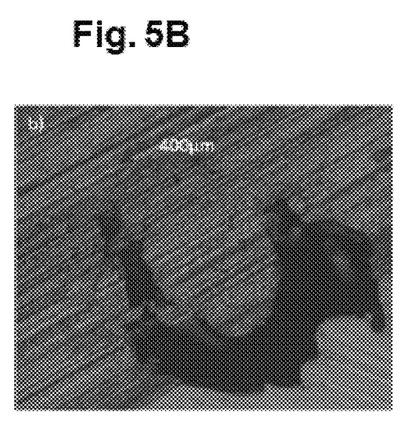

The results of FIGS. 5A and 5B show the robustness and the reliability of the invention for the integration of a sensor, here an optical Fabry-Pérot sensor. The method according to the invention allows to obtain a perfect integration of the sensor into the part, without having to previously provide the fibre with a thick layer of nickel.

Moreover, several differences between the present invention and the technique described in the document by P. Stoll et al. already mentioned above can be noted here:

- in this document, a thick layer of nickel is added around the fibre. Such a thick layer is not necessary nor implemented in the context of the present invention;
- the technique that is described in the document by P. Stoll et al. implements a scanning of the laser according to a trajectory that is alternatingly perpendicular and parallel to the wires; however, as already explained above, a non-perpendicular trajectory leads to too much heating of the fibre (hence the need, in this article, for a thick layer of nickel around the fibre).

The present invention does not implement a thick coating, the creation of which is too time-consuming, around the fibre, and it implements scanning perpendicular to the fibre, which allows to obtain a perfect integration of the fibre into the final part. The invention allows to create several sensors simultaneously, as understood for example from FIG. 3A, in a time much shorter than according to the technique described in the document by Stoll et al. already cited above (technique which requires at least 24 h to create just the fibre, which must then be integrated).

Figure 6:
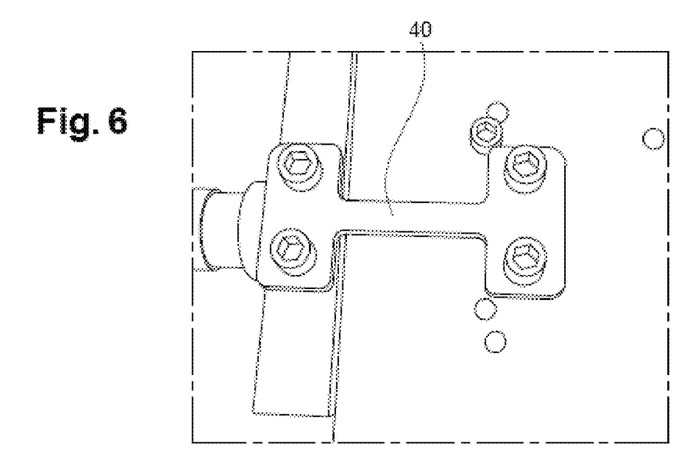
FIG. 6 shows a test specimen provided with a Fabry-Pérot sensor.

Via the method according to the invention, a test specimen 40 instrumented by a Fabry-Perot sensor was created (FIG. 6). This test specimen allows to demonstrate that it is possible to measure the deformation of a structure in a precise manner (deformation measured by the sensor from inside the part).

Figure 7:
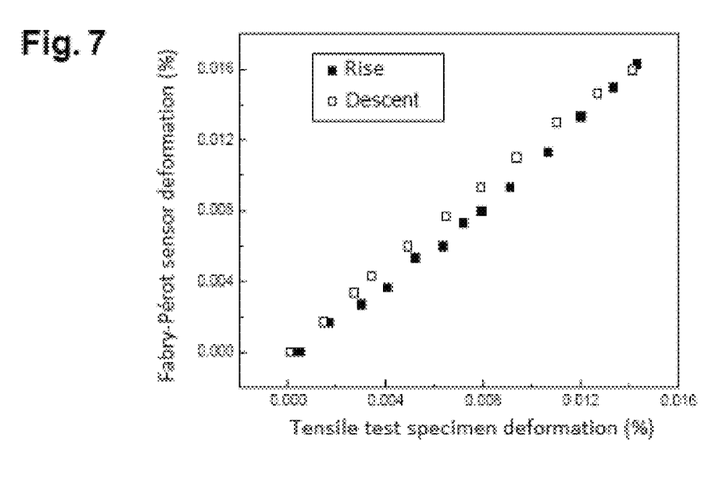
FIG. 7 shows the change in the deformation of a Fabry-Pérot sensor, when rising and when descending, during the deformation of a tensile test specimen created according to the invention.
Figure 8:
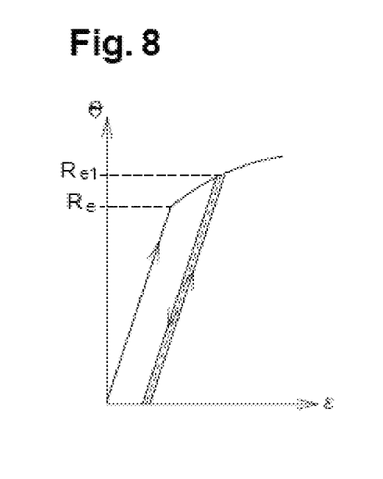
FIG. 8 shows an optical measurement of the length $L_c$.

The length $L_c$ (this is the length of the Fabry-Pérot cavity, see FIG. 4) decreases or increases according to the force applied to pull on the part; by measuring the movement $L_c$, it is thus possible to know whether the structure remains in the elastic range and thus in its correct operating mode. When a stress is applied onto the part to deform it, it can be observed that $L_c$ increases; when this stress is stopped, $L_c$ goes back to its original length (FIG. 7). The difference that can be noted in FIG. 7 between the data relative to the rise and the data relative to the descent is explained by the work-hardening law (shown in FIG. 8): once the material of the tube is deformed, its relaxation leads to a reduction in the load and the deformation is not the same as when the material is pulled on (relaxation phenomenon).

Figure 9:
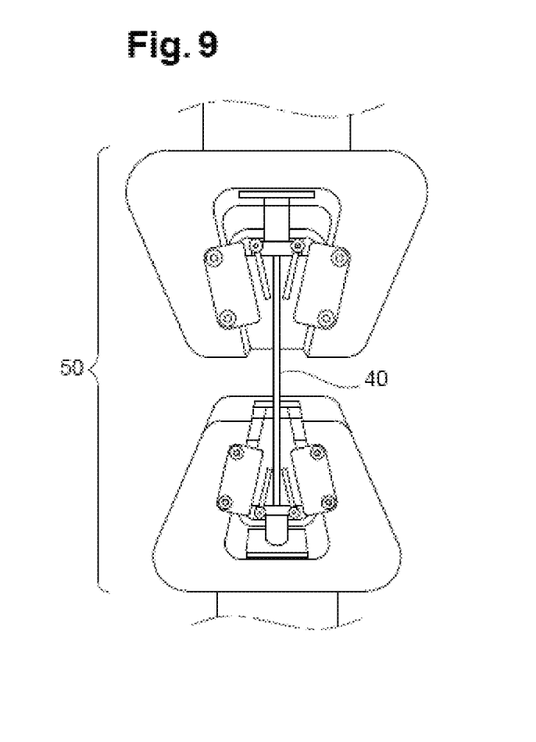
FIG. 9 shows an instrumented test specimen in a tensile testing machine.

The experimental device used is shown in FIG. 9: it includes the tensile test specimen instrumented with the Fabry-Pérot sensor, a spectrometer (not shown in the drawing) for the analysis of the signal coming from the sensor as well as a tensile testing machine 50. It is noted that the Fabry-Pérot sensor located inside the instrumented test specimen 40 gives the same deformation as the tensile test specimen (measurement carried out on the tensile testing machine). Moreover, since the measurement was carried out in the elastic range, the sensor goes back to its nominal value, namely here a deformation of 0%.

This measurement thus allows to verify the reliability of the sensor (with a return to the original length once the stress has been stopped), its robustness (the measurement is possible after integration of the sensor into a metal part), as well as its precision (precise measurement with a theoretical resolution of ±0.1 µm).

The Fabry-Pérot sensor used here allows to measure the mechanical deformations of the part caused by the tensile testing machine; but these deformations could also be caused, for example, by variations in temperature.

The invention can be applied to the spatial or aeronautical field, in the nuclear field or in the automobile field. By implementing the invention, a sensor can be inserted into a part, made by additive manufacturing, used in any one of these fields to measure variations in dimension when this part is subjected to various stresses.

The invention has various advantages:
- an optical signal of an optical fibre is not degraded by the technique of additive impression;
- the technique according to the invention can be adapted to any type of object that it is desired to create by metal additive manufacturing;
- it allows, via the integrated sensor according to the invention, to measure a part into which the latter is integrated.

The invention claimed is:

1. A method for integrating a sensor into a metal part, comprising:
    a) creating by additive printing a first part of the metal part, including a volume for housing the sensor, the volume having a width greater than that of the sensor;
    b) depositing the sensor in said housing volume; and
    c) creating by additive printing a second part of the metal part, covering the sensor and forming a molten puddle in the housing volume, on opposing sides of the sensor.

2. The method according to claim 1, wherein the sensor comprises an optical sensor, or a Fabry-Perot cavity, or a temperature sensor or a Bragg network, or an optical fibre for measurement of temperature, and/or of stress and/or of a dose of radiation by reflectometry, or a chemical sensor containing an optical fibre for measurement of gases, and/or of pH, and/or of corrosion.

3. The method according to claim 1, the additive printing of at least one of the first and second parts being carried out by laser fusion on a powder bed, or by laser fusion of a wire or by projection of powder onto a laser or by electron beam additive printing, or by DED (Directed Energy Deposition).

4. The method according to claim 1, the additive printing of at least one of the first and second parts being carried out by scanning a surface of a powder bed, including the housing volume.

5. The method according to claim 1, the housing volume having a convex shape.

6. The method according to claim 1, the additive printing implementing, during c), layers of metal powder scanned by a laser, in a manner perpendicular to a direction of extension of the sensor.

7. The method according to claim 1, further including, during c), at least one scanning, by a laser beam, of a surface of the second part which covers the sensor and according to a direction parallel to a direction of extension of the surface of the second part.

8. The method according to claim 1, further comprising creating a hollow, under a location in which the sensor must be positioned, and the addition of a solder sheet in this hollow.

9. The method according to claim 1, wherein
    the sensor comprises an element sensitive to a deformation, or to a variation in temperature or to a stress or to vibrations or to a dose of radiation, and
    the sensitive element is disposed inside a metal tube.

10. The method according to claim 9, wherein forming the sensor comprises:
    inserting a metal rod into the tube;
    inserting an optical fibre, one end of which faces an end of the rod, at a distance from the rod, the one end and the end of the rod defining a Fabry-Pérot cavity.

11. The method according to claim 10, comprising fastening the metal rod in the tube.

12. The method according to claim 10, comprising fastening the optical fibre in the tube.

13. The method according to claim 10, comprising at least one of:
    fastening the metal rod in the tube by soldering; and
    fastening the optical fibre in the tube by gluing.

14. The method according to claim 1, the metal part being made of steel, a titanium alloy, Cu, Nb, Cr, or W.

15. The method according to claim 1, the metal part being made of titanium alloy Ti64.

* * * * *